May 19, 1964     J. H. FABRICIUS ETAL     3,133,338
PROCESS FOR FORMING CERAMIC CAPACITORS
Filed Jan. 29, 1962
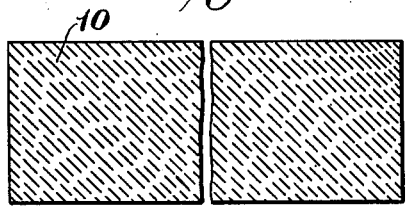
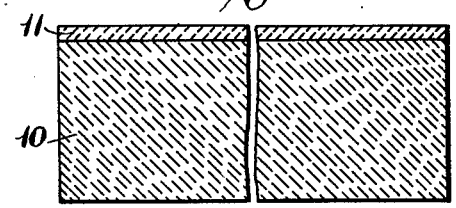
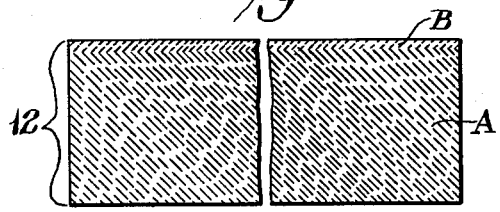
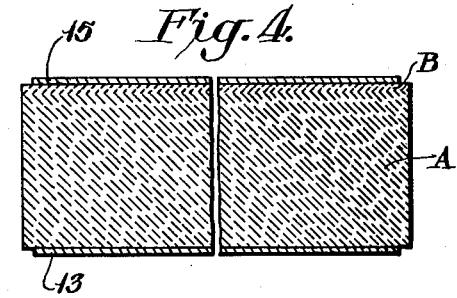
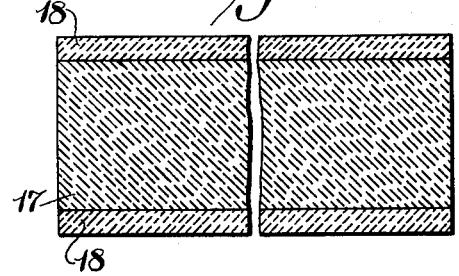
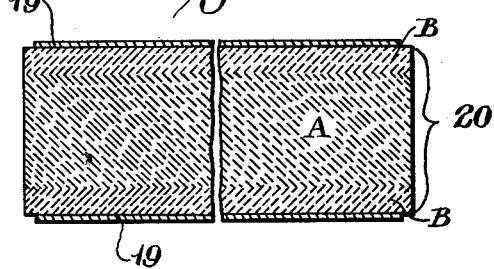
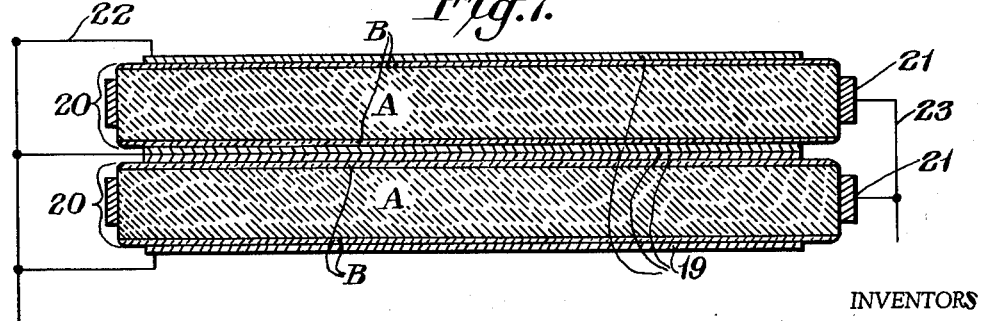
INVENTORS
John H. Fabricius
Thomas I. Prokopowicz
BY Richard G. Fisher
Connolly and Hutz
ATTORNEYS 3,133,338
PROCESS FOR FORMING CERAMIC CAPACITORS
John H. Fabricius, Stamford, Vt., and Thomas I. Prokopowicz, North Adams, and Richard G. Fisher, Williamstown, Mass., assignors to Sprague Electric Company, North Adams, Mass., a corporation of Massachusetts
Filed Jan. 29, 1962, Ser. No. 169,334
4 Claims. (Cl. 29—25.42)

This invention relates to a process for forming electrical capacitors comprising ceramic materials, and in particular refers to a process for forming comparatively physically thick but electrically thin ceramic capacitors.

It is well known that refractory dielectric materials, such as alkaline earth metal titanates or a mixture of such titanates with a small quantity of other substances, are of particular value as the dielectric material of electrical capacitors. A thin sheet of these materials with electrodes diametrically positioned on surfaces of the sheet have excellent capacitance. Capacitors made up of these thin materials have particularly desirable electrical characteristics. Unfortunately, such capacitors have very poor mechanical characteristics. As a result in ordinary usage, the ceramic materials are broken or injured causing a defect in the capacitor. The brittleness and general fragility of these products makes them undesirable despite the good electrical characteristics. To overcome the foregoing disadvantages, various efforts were made to provide for a capacitor of a thin ceramic dielectric. For example, capacitors made up of the thin ceramic material were carefully handled to avoid breakage. It is, however, particularly difficult to avoid fracture and breakage when the capacitor is assembled into a unit which is subject to inevitable jars and shocks and other mechanical strain.

It has also been suggested that the ceramic material could be protected from damage by a protective coating or by encapsulation of the capacitor unit. The expedient, however, does not solve the problem of fragility during manufacture, since many units are lost through breakage during the encapsulation step.

A prior art process has been disclosed which yields a ceramic material which is comparatively physically thick but electrically thin. This process comprises forming a body of a titanate containing a minor amount of a rare earth oxide followed by firing the body to maturity in air at a temperature of about 2450° F. Thereafter, this body is reduced by firing in hydrogen at a temperature of from 2100° F. to 2300° F. It is stated that this treatment imparts semiconducting properties to the body. When electrodes are fired on opposite sides of the body, a thin insulating barrier layer is formed under the electrodes as a result of the reoxidation of the surface of the semiconductor. The resulting unit is a capacitor having an extremely thin i.e. 0.1 mil, dielectric layer which is protected from damage by being in association with the semiconducting body. Subsequent experimentation has shown that this process can be advantageously improved upon.

It is an object of this invention to overcome the foregoing disadvantages of the prior art and many other disadvantages which directly or indirectly result therefrom.

A further object of this invention is to produce a dielectric body for ceramic capacitors which possesses the advantages of the prior art thin bodies without at the same time being subject to their disadvantages.

A still further object of this invention is to produce ceramic capacitors which may be employed in a wide variety of uses wherein prior art capacitors were of limited value because of their lack of mechanical strength.

A still further object is to produce in one process ceramic capacitor bodies which have extremely thin dielectric layers and yet have mechanical strength.

Yet another object of this invention is to produce ceramic capacitors having extremely thin dielectric layers of better dielectric strength than prior art capacitors having layers of comparable thickness.

These and other objects of this invention will become apparent upon consideration of the following description taken together with the accompanying drawings in which:

FIGURE 1 is a sectional side view on an enlarged scale showing an intermediate ceramic body according to this invention;

FIGURE 2 is a sectional side view of the ceramic body of FIGURE 1 carrying a superimposed coating of ceramic dielectric material;

FIGURE 3 is a sectional side view of an integral ceramic unit after processing of the body and coating of FIGURE 2;

FIGURE 4 is a sectional side view of the body of FIGURE 3 with electrodes applied to diametral surfaces;

FIGURE 5 is a sectional side view of a modified integral ceramic unit having a ceramic body with dielectric layers at each surface;

FIGURE 6 is a sectional side view of the fired body of FIGURE 5 having attached electrodes on diametral surfaces; and FIGURE 7 illustrates a section of an assembly of stacked ceramic capacitors employing this unit of FIGURE 5.

In general, the objects of this invention are obtained in a ceramic dielectric body for a capacitor which is produced by combining two different ceramic materials into a single integral block of ceramic material so that a very thin layer of high permittivity high resistivity ceramic material is combined with a ceramic having semiconducting properties. In a more restricted sense this invention is concerned with a process whereby a ceramic body is made up of a layer with semiconducting properties which has applied to it and permanently integrated with it a layer of ceramic material which has good dielectric and high resistivity characteristics. In a still more restricted sense this invention pertains to a body of ceramic material, which has a zone of an alkaline earth metal titanate containing impurities, which give semiconducting properties to the titanate when fired in air and an integrally attached ceramic layer or layers of high dielectric constant and high resistivity on the semiconducting portion.

An important feature of this invention resides in the discovery that the semiconducting layer or zone of the ceramic body can be formed without resorting to a hydrogen reduction step as required in prior art processes. For the purposes of this invention, the primary requisite is that the resistivity of the semiconducting layer be low enough so that the properties of the dielectric layer, especially dissipation factor, are not affected by the semiconductor at frequencies at which the device would be operated. Investigation has established that the difference in resistivity between units fired in hydrogen and air is so small as to be of no practical significance. As long as the resistivity is less than 1000 ohm-cm. at 25° C. the primary requisite is satisfied. The lower limit of resistivity is controlled only by considerations of expense. Thus, the supporting layer could be a relatively thick electrode, such as platinum or palladium, rather than a semiconductor, however, this is impractical from an economic standpoint.

In its preferred embodiment, this invention is concerned with the formation of a rugged barium titanate capacitor having a dielectric thickness down to 1 mil and less. A powdered ceramic material, such as barium titanate, doped with an agent for producing semiconductivity is formed into a body having the desired resistivity. Then powdered particles of a titanate are distributed in a uniform coating over a surface of the body. The powder and the body are pressed together under a substantial pressure. The composite disc is then fired in air at the sintering temperature of the titanate to produce a non-porous sintered body. In the resultant unit the coating becomes a stratum of high resistivity. Following this the resultant dielectric body may have capacitor electrodes applied to the surfaces of the body and suitable leads attached to the electrodes.

The insulating ceramic, i.e. the dielectric layer or zone, may be formed from an alkaline earth metal titanate or mixtures thereof and the same may be modified by additions of other materials, for example zirconates and stannates. This material may be applied in any convenient manner, such as, in powder form, as a slurry or slip, etc.

The semiconducting bodies may be formed from alkaline earth metal titanates containing an appropriate amount of an agent for producing semiconductivity, for example, compounds containing the ions of vanadium, niobium, lanthanum, the rare earth ions, uranium, tungsten, thorium, bismuth, antimony, fluorine, etc. and mixtures thereof. Obviously this is not an exclusive group since any agent which will impart, under the disclosed conditions, a resistivity of less than 1000 ohm-cm. at 25° C. to the titanate is contemplated.

In the preparation of the device of this invention with a barium titanate, a suitable ceramic can be prepared from a mix made up in keeping with the representative procedure in which 100 grams of chemically pure barium titanate, wherein the ratio of BaO of $TiO_2$ is in agreement with the stoichiometric formula, is mixed with 150 cc. of distilled water, and this mixture is milled in a porcelain mill ¼ filled with porcelain balls until a fine-grained powder is obtained. It is important in this mixture that the ball milling be limited to the extent necessary to permit the mixing function to be fulfilled while insuring that the mixture is not contaminated by the ball material. It has been found that ball milling for four hours satisfies both of these conditions. The milled material is removed from the mill, permitted to settle, and the supernatant water drawn off. To the remaining slurry is added 60 milliliters of a binder solution of 5% methyl-cellulose in water, and the resulting mixture is then dried in an oven at 100° C. for approximately 3 to 4 hours. The dried product is then broken up and sieved to 300 to 100 mesh. A suitably chemically pure barium titanate is one for example which has less than 0.05% silica, less than 0.05% alumina, less than 0.05% phosphorous pentoxide and less than 0.1% sodium oxide.

This barium titanate mix is suitable for the dielectric stratum. It is also suitable for the semi-conducting body with the addition of impurities to provide the required resistivity to the body.

A specific embodiment illustrating the invention is shown in FIGURES 1 to 4. The capacitor of this specific embodiment has a semiconducting zone integral with a high permittivity high resistivity zone and suitable electrodes on the surface of the zones. Referring to the figures in illustration of the making of this capacitor, FIGURE 1 represents a mix of barium titanate particles in accordance with the above description taken with niobium pentoxide impurity according to the following formula

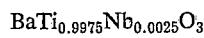

This mix is compacted into an intermediate body 10 by placing the mix under a pressure of about 100 pounds per square inch in a suitable die. FIGURE 2 illustrates the next step in the preparation in which a coating 11 of barium titanate is spread over the upper surface of the intermediate body 10. The combination of the intermediate body 10 and the coating 11 is subjected to about 10,000 pounds per square inch in a suitable die. The resultant composite body is fired in air at about 1350° C. for about one-half hour so that the composite body becomes a well formed non-porous and integral body 12 as shown in FIGURE 3. The integral body 12 is made up of a semi-conducting zone A and a high permittivity high resistivity zone B integral with zone A. The resistivity value of the semiconducting zone A is less than 1000 ohm-cm. at 25° C. A liquid alloy of gallium, indium and tin electrode 13 is applied to a surface on the lower side of the zone A and a silver electrode 15 is applied to an upper surface of the zone B. In this example the dielectric layer may be formed first and the semiconducting layer applied thereto.

In order to find the characteristics of a device such as shown in FIGURE 4 leads were attached to electrodes 13 and 15 of a capacitor in which the zone B had a dielectric constant of 5500 and a resistivity of $2.2 \times 10^9$ ohm-cm. at room temperature. The dielectric zone had a thickness of the order of 5.5 mils. The semiconducting zone A had a thickness of 15 mils. At an A.C. voltage of 0.8 volt at 1 kilocycle and 25° C. the capacity was 11,900 μμf. and the dissipation factor was 4.0 percent.

A modified embodiment is shown in FIGURES 5 and 6. In this modification the semiconducting zone has zones of high permittivity-high resistivity on both sides thereof. The resultant device, formed by applying electrodes to this dielectric-semiconducting-dielectric arrangement, can be adapted to provide two capacitors connected either in parallel or series. In FIGURE 5 an intermediate body of a semiconducting ceramic is made up of a mix of barium titanate particles prepared as described above together with niobium pentoxide according to the formula

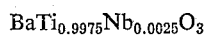

This mix compacted into the intermediate body 17 had suitably applied to diametrically positioned surfaces coatings 18. The coatings 18 are made up of the barium titanate mix described above and without any impurity added. The assembly of intermediate body 17 and its coatings 18, upon being subjected to compression of the order of 10,000 pounds per square inch and firing in air at 1350° C., result in an integrated unit 20, such as shown in FIGURE 6. This integrated unit has a center semiconducting zone A of barium titanate and niobium oxide, with zones B on both sides thereof made up of a high permittivity-high resistivity barium titanate. Silver electrodes 19 are fired on the surfaces of zones B to provide a capacitor body.

In order to find the characteristics of a capacitor such as shown in FIGURE 6 leads were attached to electrodes 19. In these capacitors the zones B each had a dielectric constant of 1700 and a thickness of 3 mils. The semiconducting zone A had a thickness of 10 mils. The capacitors were deaged at a temperature above the curie point and then aged at 25° C. for 24 and 70 hours. They were then tested for electrical characteristics at various voltages. The following table sets forth the results after 24 hours of aging.

| Units (after 24 hrs.) | 0.1 Volt, R.M.S. | 0.3 Volt, R.M.S. | 0.8 Volt, R.M.S. |
|---|---|---|---|
| First: | | | |
| Capacity (μμf.) | 3,094 | 3,094 | 3,190 |
| Percent Tan δ | 1.65 | 1.8 | 2. |
| Second: | | | |
| Capacity (μμf.) | 2,762 | 2,767 | 2,835 |
| Percent Tan δ | 1.60 | 1.63 | 2.42 |

The above tests were at 25° C., 1 kilocycle.

The following table sets forth the results after 70 hours of aging.

| Units (after 70 hrs.) | 0.1 Volt, R.M.S. | 0.3 Volt, R.M.S. | 0.8 Volt, R.M.S. |
|---|---|---|---|
| First: | | | |
| Capacity ($\mu\mu$f.) | 3,042 | 3,055 | 3,122 |
| Percent Tan $\delta$ | 1.55 | 1.66 | 2.45 |
| Second: | | | |
| Capacity ($\mu\mu$f.) | 2,707 | 2,743 | 2,745 |
| Percent Tan $\delta$ | 1.43 | 1.44 | 1.96 |

The above tests were as 25° C., 1 kilocycle.

In FIGURE 7 two of the capacitor units shown in FIGURE 6 are assembled in a stack to provide four capacitors connected in parallel. The units are assembled so that one electrode 19 of one unit is in contact with one electrode 19 of the other unit forming a common electrode. The four electrodes 19 are connected together through leads 22. The semiconducting zones A of each of the units 20 has an electrode 21 in contact therewith, which electrodes are connected together through lead 23. Thus, each of the units provides two capacitors in which the electrodes 21 provide one set of plates and the electrodes 19 provide the other set of plates. Between these respective plates are the dielectric zones B and the common semiconducting zone A. Thus, four capacitors connected in parallel are provided by the stack arrangement of FIGURE 7.

Another modified embodiment of this invention is provided by an arrangement of the ceramic materials in which a zone of high resistivity ceramic dielectric is sandwiched in between two zones of semiconducting ceramic to provide a sandwich construction. Suitable electrodes are applied to diametral surfaces of the arrangement to provide a capacitor. This modification has certain peculiar advantages, including particularly good life characteristics. This embodiment also may be stacked and connected in parallel similar to the arrangement shown in FIGURE 7.

Various other modifications and capacitor configurations may be employed within the teachings of the instant invention. The ceramic capacitor may be tubular in shape formed in the following manner. A powdered ceramic material, such as barium titanate, doped with an agent for producing semiconductivity, as illustrated above, is formed into a tubular body having the desired resistivity. Powdered particles of barium titanate are then applied to the inner surface of the tube. The composite tube is then fired in air at the sintering temperature of the barium titanate to produce a nonporous, integral, tubular body having a semiconducting zone and a high resistivity dielectric zone. Electrodes are then applied to the interior and the exterior of said tube. Such a construction provides a miniature tubular capacitor in which the active ceramic dielectric thickness may be less than 1 mil and which has considerably greater structural strength than any other ceramic capacitor having so thin a ceramic dielectric. In the preceding embodiment the powdered barium titanate may be coated on the outside rather than the inside of the tube.

Another modification is that the capacitor may be rod-shaped. In this variation a powdered ceramic material, such as barium titanate, doped with one of the above agents for producing semiconductivity, is formed into a rod or solid bar. A barium titanate ceramic slip is coated over the cylindrical surface of the semiconducting bar so that the ends of the bar and a small cylindrical area near the ends of the bar are free of ceramic slip. This composite bar is then fired in air at the sintering temperature of the barium titanate to produce a non-porous, integral rod having a semiconducting zone and a high resistivity dielectric zone. An electrode is affixed to one or both ends of the semiconducting zone and also to the dielectric surface to complete the capacitor.

There obviously can be no absolute limits with respect to the relative thicknesses of the semiconducting zone and the high resistivity dielectric zone. The function of the semiconducting zone is to add strength to the dielectric zone. The semiconducting zone does not have to be thicker than the dielectric zone in order to perform this function since, for example, a 2 mil zone of semiconductor adds considerable strength to a 4 mil zone of dielectric. Thus, the relative thicknesses are limited only by practical considerations. One skilled in the art can readily determine the thickness of semiconductor required to strengthen any given thickness of dielectric. For most commercial purposes, a convenient thickness range for the dielectric zone would be from about 0.1 mil to about 20 mils with any semiconducting zone thickness which will add practical strength to this material.

The amount of doping agent to be added to the ceramic material is controlled by the resistivity desired. As stated above, the resistivity should be less than 1000 ohm-cm. at 25° C. Investigation has shown that in most cases about 0.1 to about 0.5% by weight doping agent will yield the desired resistivity after the proper firing.

The firing temperature and time will vary depending upon the particular material employed. In most instances a resistivity of less than 1000 ohm-cm. at 25° will be obtained by firing in air at between about 1218° C. to about 1500° C. for between about ½ to about 2 hours.

The electrode material is generally of a high conductivity and makes a good electrical contact with the surface of the ceramic to avoid any unnecessary electrical resistance. In place of permanent electrodes, various other types of electrodes may be employed, such as liquid electrodes, etc.

The resistivity as referred to above represents the value of a substance in terms of the resistance thickness times the cross-section area. The standard of resistivity for a metal is defined in terms of a conductor one meter thick and one meter square in cross-section. The resistivity values referred to in this description are comparable values for ceramics. Conductivity is sometimes used to specify the current carrying ability of a material and is defined as the reciprocal of the resistivity. In the above described embodiments the relative resistivities of the ceramic materials have been produced by the addition of specified impurities to the barium titanate ceramic of the semiconducting part.

The rugged, thin dielectric ceramic capacitors produced in accordance with this invention have a wide range of useful applications. They are particularly useful as low voltage capacitors having a thin dielectric and a capacity in the range of .05 to 1 $\mu$f. for transistorized circuits. Also this invention provides a ceramic capacitor in the 50 volt range with dielectric thicknesses down to less than 1 mil which will withstand rough handling.

The foregoing invention is also useful in obtaining very thin but not fragile sheets of insulating material. These sheets may be used for any purpose where an insulating ceramic stratum with semiconducting ceramic base integral therewith can be used. These sheets of combined material may be used for numerous purposes where self-sustaining sheets of insulating material have previously been used.

As many widely different embodiments of this invention may be made without departing from the spirit and scope thereof, it is to be understood that the invention is not limited to the specific embodiments thereof except as defined in the appended claims.

What is claimed is:

1. A method for making a physically strong ceramic capacitor comprising contacting a surface of an intermediate body of a barium titanate powder which has been doped with an agent for producing semiconductivity in said powder with a layer of a titanate powder, subjecting the layered body to compression, firing the compressed body in air to form a single, coherent, integral unit having a semiconducting zone with a resistivity of less than about 1000 ohm-cm. at 25° C., and a dielectric zone, applying one electrode to the surface of the semiconducting zone and another electrode to the surface of the dielectric zone.

2. A method for making a physically strong ceramic capacitor comprising forming an intermediate, unfired body of a titanate containing an impurity for producing semiconductivity, applying to one surface of said body a coating of a titanate powder, firing the coated body in air at a temperature between about 1218° C., to about 1500° C. for between ½ to about 2 hours to form a single, coherent, integral unit having a semiconducting zone with a resistivity of less than about 1000 ohm-cm. at 25° C. and a dielectric zone, applying one electrode to the semiconducting surface and another electrode to the dielectric surface.

3. A method for making a physically strong ceramic capacitor comprising forming two intermediate, unfired bodies of a titanate containing an impurity for producing semiconductivity, sandwiching in between said two bodies a layer of a titanate powder, firing the composite body in air at a temperature between about 1218° C. to about 1500° C. for between ½ to about 2 hours to form a single coherent integral unit having a pair of semiconducting zones with a resistivity of less than 1000 ohm-cm. at 25° C. and a dielectric zone, applying electrodes to diametral surfaces of the semiconducting zones to provide a capacitor.

4. A method for forming a ceramic insulating shock resistant body comprising doping a titanate powder with an agent for producing semiconductivity in said powder, forming the doped powder into an intermediate body, applying a coating of a titanate powder to the surface of said body, firing the coated body in air to form a single, coherent, integral unit having a semiconducting zone with a resistivity of less than about 1000 ohm-cm. at 25° C. and a dielectric zone.

References Cited in the file of this patent

UNITED STATES PATENTS 3,028,656      Herbert et al. _____ Apr. 10, 1962

UNITED STATES PATENT OFFICE
CERTIFICATE OF CORRECTION

Patent No. 3,133,338                                   May 19, 1964

John H. Fabricius et al.

It is hereby certified that error appears in the above numbered patent requiring correction and that the said Letters Patent should read as corrected below.

Column 4, in the table, under capacitance at 0.3 Volt, R.M.S., for "3,094" read -- 3,097 --; column 5, line 12, for "as" read -- at --; column 6, line 24, for "25°" read -- 25° C. --.

Signed and sealed this 3rd day of November 1964.

(SEAL)
Attest:

ERNEST W. SWIDER                                EDWARD J. BRENNER
Attesting Officer                                    Commissioner of Patents